US010232771B2

(12) United States Patent
Zehr

(10) Patent No.: US 10,232,771 B2
(45) Date of Patent: Mar. 19, 2019

(54) CARBON MONOXIDE ALARM ASSEMBLY

(71) Applicant: Travis Zehr, Highland, NY (US)

(72) Inventor: Travis Zehr, Highland, NY (US)

( * ) Notice: Subject to any disclaimer, the term of this patent is extended or adjusted under 35 U.S.C. 154(b) by 7 days.

(21) Appl. No.: 15/611,962

(22) Filed: Jun. 2, 2017

(65) Prior Publication Data

US 2018/0345859 A1 Dec. 6, 2018

(51) Int. Cl.
*B60Q 9/00* (2006.01)
*G08B 21/14* (2006.01)

(52) U.S. Cl.
CPC ............... *B60Q 9/00* (2013.01); *G08B 21/14* (2013.01)

(58) Field of Classification Search
CPC .................................. B60Q 9/00; G08B 21/14
See application file for complete search history.

(56) References Cited

U.S. PATENT DOCUMENTS

| | | | | |
|---|---|---|---|---|
| D350,300 S | | 9/1994 | Browning et al. | |
| 5,739,756 A | | 4/1998 | Margulies | |
| 6,057,755 A | * | 5/2000 | Phillips | G08B 21/14 340/438 |
| 6,208,256 B1 | | 3/2001 | Fleming | |
| 6,448,888 B1 | | 9/2002 | Horner et al. | |
| 9,194,358 B1 | | 11/2015 | Avramidis | |
| 2013/0014964 A1 | * | 1/2013 | Yoshida | A62C 13/62 169/89 |
| 2014/0074383 A1 | | 3/2014 | Frey | |
| 2015/0033477 A1 | * | 2/2015 | Rubin | B25D 5/02 7/158 |
| 2016/0272112 A1 | * | 9/2016 | DeGrazia | B60Q 9/00 |

* cited by examiner

*Primary Examiner* — Mohamed Barakat

(57) ABSTRACT

A carbon monoxide alarm assembly includes an alarm unit that is selectively positioned within a vehicle thereby facilitating the alarm unit to be in fluid communication with an interior of the vehicle. The alarm unit detects carbon monoxide and the alarm unit emits an audible alarm when the alarm unit detects carbon monoxide. In this way the alarm unit alerts a driver to exit the vehicle. An emergency tool is removably coupled to the alarm unit and the emergency tool is selectively manipulated. The emergency tool has a blade to cut a seat belt and a breaker thereon to break a window in the vehicle.

12 Claims, 5 Drawing Sheets

CARBON MONOXIDE ALARM ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to alarm devices and more particularly pertains to a new alarm device for detecting carbon monoxide in a vehicle.

BRIEF SUMMARY OF THE INVENTION

An embodiment of the disclosure meets the needs presented above by generally comprising an alarm unit that is selectively positioned within a vehicle thereby facilitating the alarm unit to be in fluid communication with an interior of the vehicle. The alarm unit detects carbon monoxide and the alarm unit emits an audible alarm when the alarm unit detects carbon monoxide. In this way the alarm unit alerts a driver to exit the vehicle. An emergency tool is removably coupled to the alarm unit and the emergency tool is selectively manipulated. The emergency tool has a blade to cut a seat belt and a breaker thereon to break a window in the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
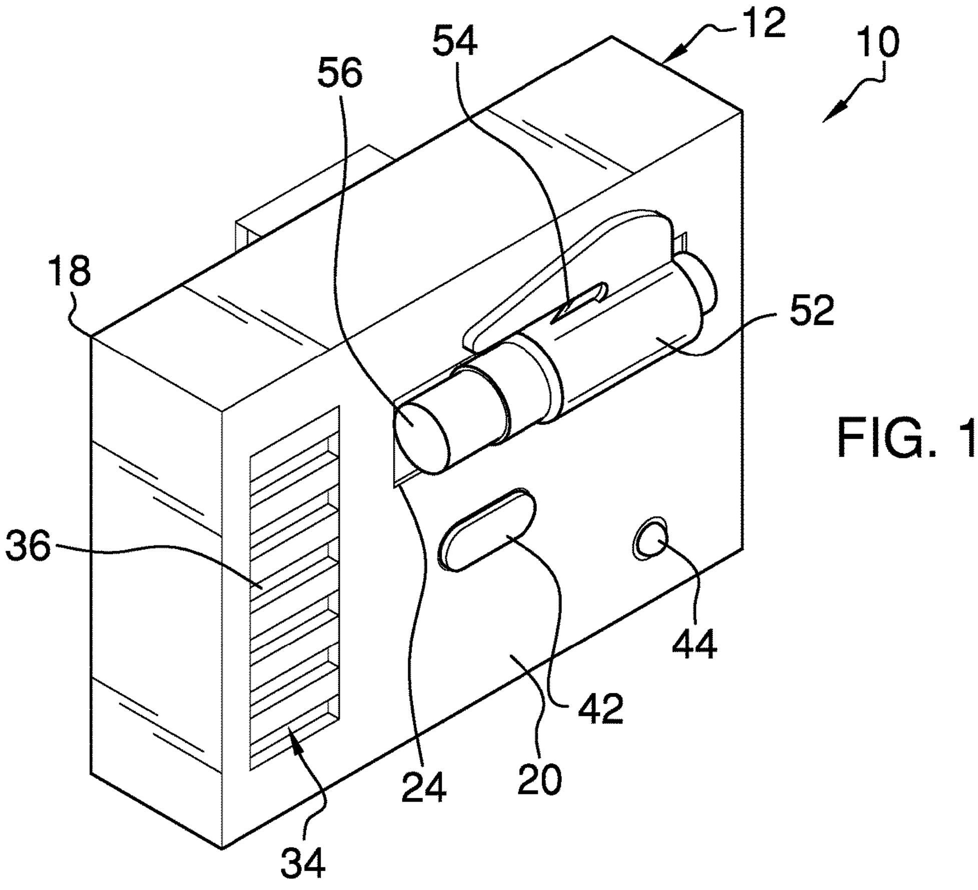
FIG. 1 is a front perspective view of a carbon monoxide alarm assembly according to an embodiment of the disclosure.
Figure 2:
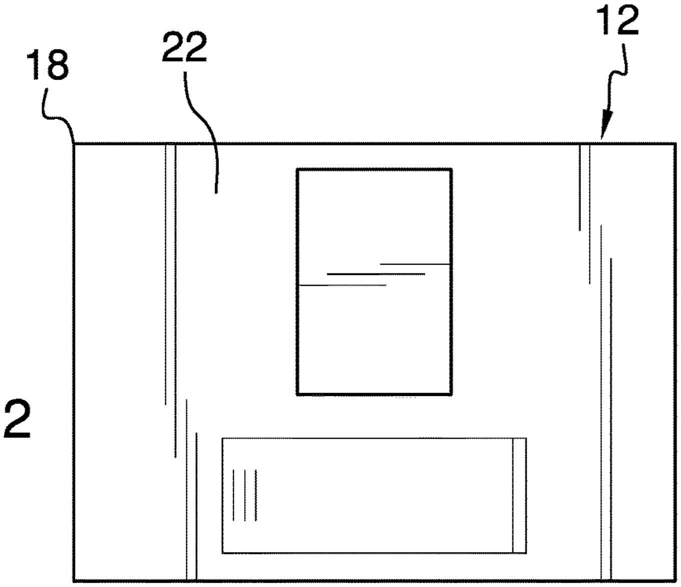
FIG. 2 is a back view of an embodiment of the disclosure.
Figure 3:
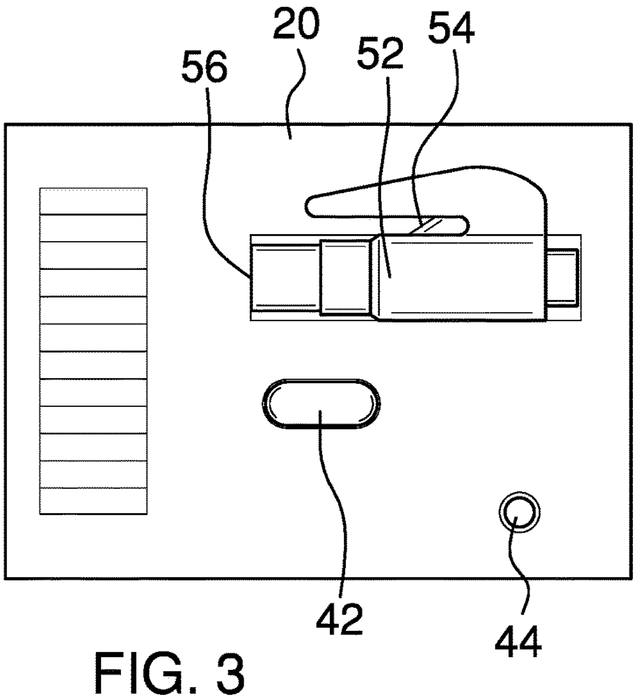
FIG. 3 is a front view of an embodiment of the disclosure.
Figure 4:
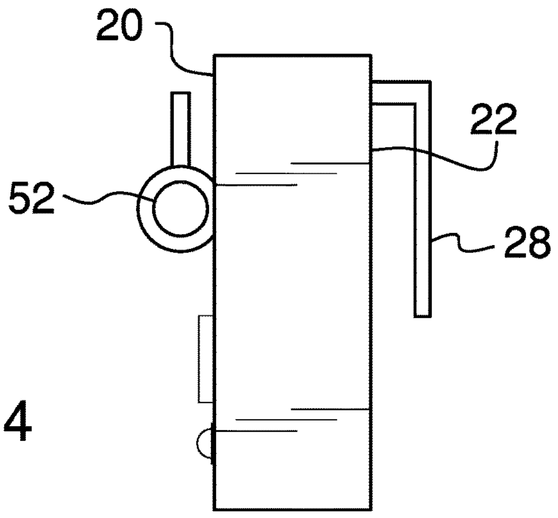
FIG. 4 is a right side view of an embodiment of the disclosure.
Figure 5:
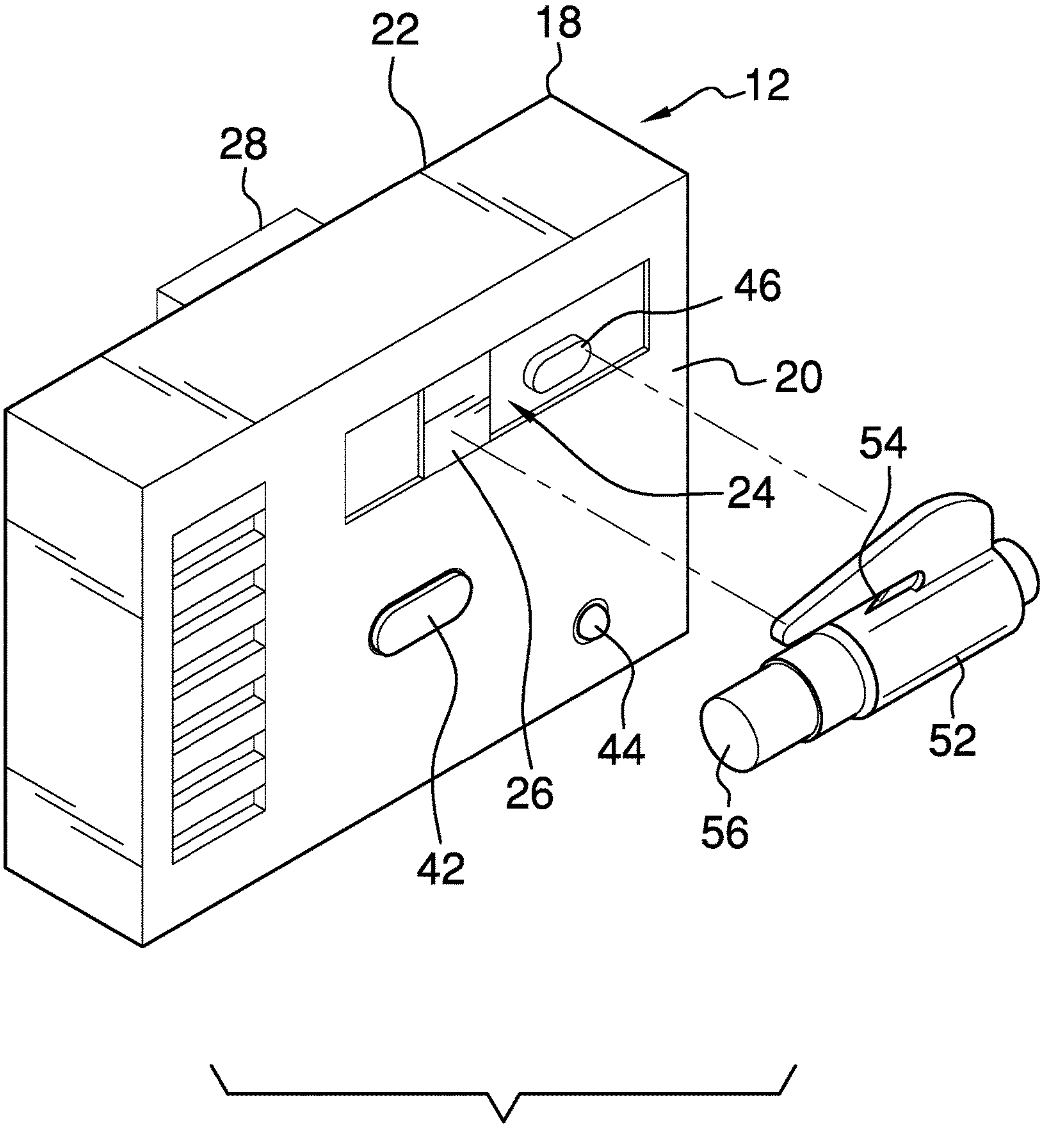
FIG. 5 is an exploded perspective view of an embodiment of the disclosure.
Figure 6:
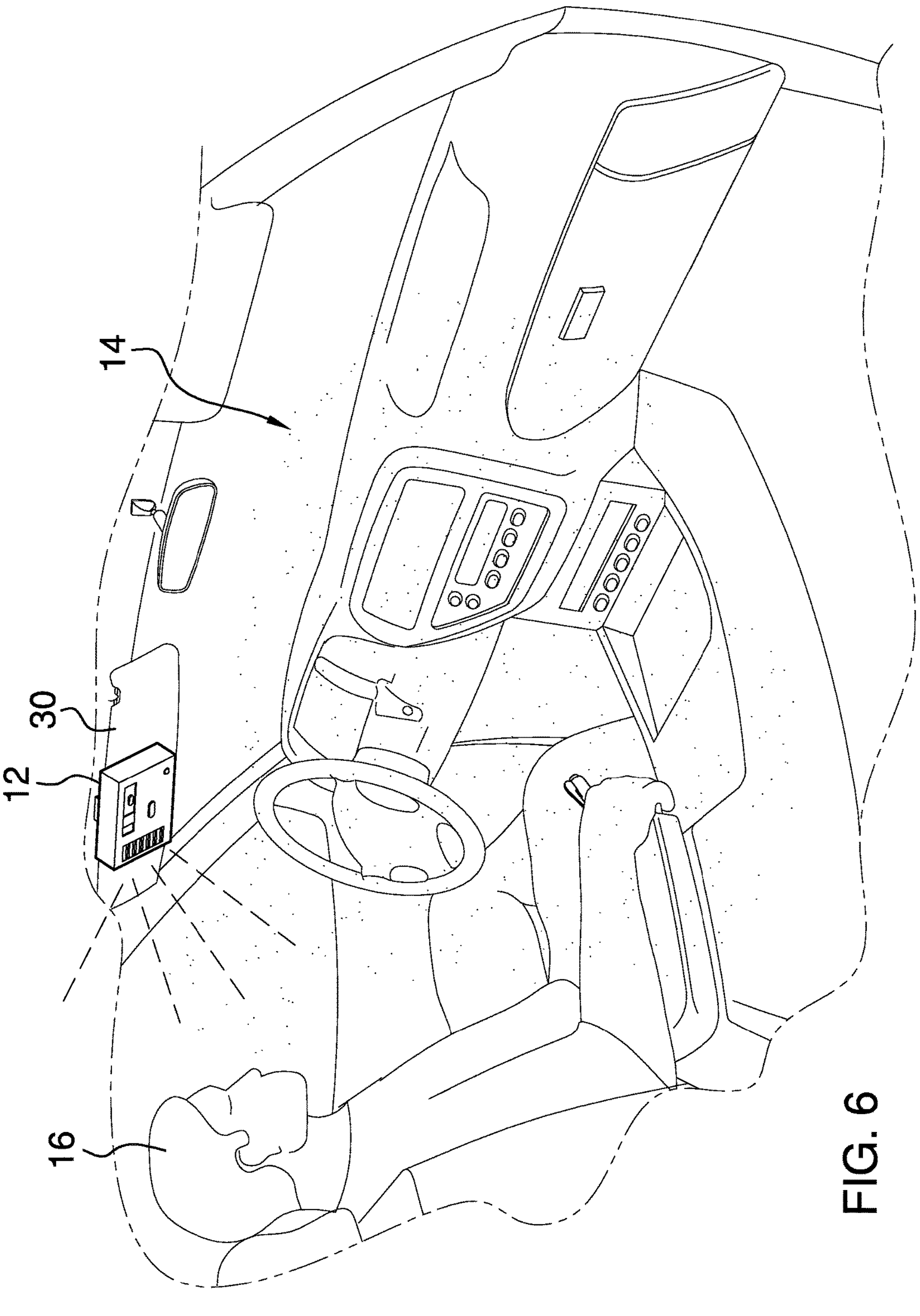
FIG. 6 is a perspective in-use view of an embodiment of the disclosure.
Figure 7:
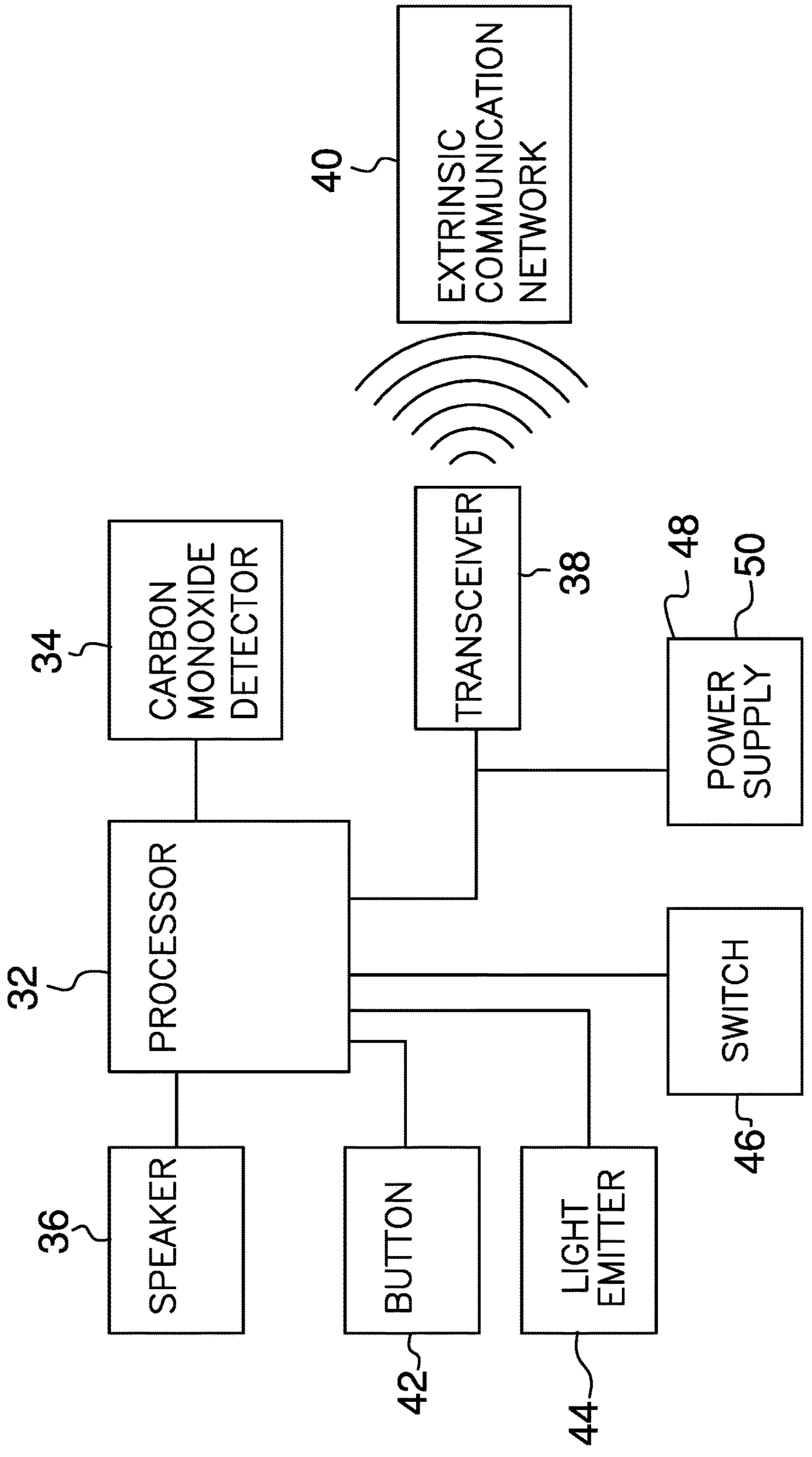
FIG. 7 is a schematic view of an embodiment of the disclosure.

With reference now to the drawings, and in particular to FIGS. 1 through 7 thereof, a new alarm device embodying the principles and concepts of an embodiment of the disclosure and generally designated by the reference numeral 10 will be described.

As best illustrated in FIGS. 1 through 7, the carbon monoxide alarm assembly 10 generally comprises an alarm unit 12 that is positioned within a vehicle 14. Thus, the alarm unit 12 is in fluid communication with an interior of the vehicle 14. The alarm unit 12 detects carbon monoxide and the alarm unit 12 emits an audible alarm when the alarm unit 12 detects carbon monoxide. In this way the alarm unit 12 alerts a driver 16 to exit the vehicle 14. The vehicle 14 may be a passenger vehicle, a cargo vehicle and any other vehicle that has an enclosed cabin.

The alarm unit 12 comprises a housing 18 that has a front side 20 and a back side 22, and the front side 20 has a recess 24 extending toward the back side 22. A fastener 26 is coupled to the front side 20 and the fastener 26 is positioned in the recess 24. The fastener 26 may comprise a magnet or a mechanical fastener 26. A clip 28 is provided and the clip 28 is coupled to the back side 22. The clip 28 is spaced from the back side 22 to frictionally engage a support 30 in the vehicle 14, such as a visor or the like. The front side 20 may have a plurality of vents extending into an interior of the housing 18.

A processor 32 is positioned within the housing 18 and the processor 32 selectively generates an alarm sequence. A carbon monoxide detector 34 is coupled to the housing 18 to detect carbon monoxide in the vehicle 14. The carbon monoxide detector 34 is electrically coupled to the processor 32 and the processor 32 generates the alarm sequence when the carbon monoxide detector 34 detects carbon monoxide. The carbon monoxide detector 34 may be an electronic carbon monoxide detector 34 or the like and the carbon monoxide detector 34 may be aligned with the vents in the housing 18.

A speaker 36 is coupled to the housing 18 to emit audible sounds outwardly therefrom. The speaker 36 is electrically coupled to the processor 32 and the speaker 36 is turned on when the processor 32 generates the alarm sequence. In this way the speaker 36 alerts the driver 16 to exit the vehicle 14. The speaker 36 may be an electronic speaker 36 or the like.

A transceiver 38 is positioned within the housing 18 and the transceiver 38 is electrically coupled to the processor 32. The transceiver 38 is in electrical communication with an extrinsic communication network 40. In this way the transceiver 38 may contact emergency responders when the processor 32 generates the alarm sequence. The transceiver 38 may be a radio frequency transceiver 38 or the like and the extrinsic communication network 40 may be a cellular phone network, the internet and any other electronic communication network.

A button 42 is coupled to the front side 20 of the housing 18 and the button 42 is selectively manipulated. The button 42 is electrically coupled to the processor 32 and the processor 32 generates the alarm sequence when the button 42 is manipulated. In this way the transceiver 38 contacts the emergency responders such as local law enforcement or the like. A light emitter 44 is coupled to the front side 20 of the housing 18 to emit light outwardly therefrom. The light emitter 44 is electrically coupled to the processor 32 and the light emitter 44 is turned on when the processor 32 generates the alarm sequence. In this way the emergency responder may visually identify the vehicle 14 and the light emitter 44 may comprise an LED or the like.

A switch 46 is coupled to the front side 20 of the housing 18 and the switch 46 is positioned in the recess 24. The switch 46 is electrically coupled to the processor 32 and the processor 32 generates the alarm sequence when the switch 46 is turned on. Moreover, the switch 46 is biased into an on position. A power supply 48 is coupled to the housing 18 and the power supply 48 is electrically coupled to the processor 32. The power supply 48 comprises at least one battery 50.

An emergency tool 52 is removably coupled to the alarm unit 12 and the emergency tool 52 is selectively manipulated. The emergency tool 52 has a blade 54 thereon to cut a seat belt and a breaker 56 thereon to break a window in the vehicle 14. Moreover, the emergency tool 52 may be an emergency vehicle escape tool of any conventional design. The emergency tool 52 is removably positioned in the recess 24 having the fastener 26 removably engaging the emergency tool 52 to retain the emergency tool 52 in the recess 24 for storage. The emergency tool 52 engages the switch 46 when the emergency tool 52 is positioned in the recess 24 to turn the switch 46 off. Moreover, the switch 46 is turned on the when the emergency tool 52 is removed from the recess 24.

In use, the clip 28 is manipulated to engage the support 30 such that the housing 18 is retained in the vehicle 14 to be accessible by the driver 16. The speaker 36 emits the audible alarm when the carbon monoxide detector 34 detects carbon monoxide. In this way the driver 16 is alerted to exit the vehicle 14 to avoid injury and death from inhaling the carbon monoxide. The emergency tool 52 is removed from the housing 18 when the driver 16 becomes trapped in the vehicle 14. Thus, the switch 46 is turned on and the processor 32 generates the alarm sequence, thereby facilitating the transceiver 38 to contact the emergency responders. Moreover, the emergency tool 52 is manipulated to selectively cut the seat belt and smash the window thereby facilitating the driver 16 to exit the vehicle 14. In this way the carbon monoxide detector 34 and the emergency tool 52 enhance the driver 16's safety while operating the vehicle 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A carbon monoxide alarm assembly being configured to be positioned in a vehicle, said assembly comprising:

an alarm unit being configured to be positioned within a vehicle thereby facilitating said alarm unit to be in fluid communication with an interior of the vehicle, said alarm unit detecting carbon monoxide, said alarm unit emitting an audible alarm when said alarm unit detects carbon monoxide wherein said alarm unit is configured to alert a driver to exit the vehicle, said alarm unit comprising a housing having a front side and a back side, said front side having a recess extending toward said back side, said alarm unit comprising a processor being positioned within said housing, said processor selectively generating an alarm sequence, and a switch being coupled to said front side of said housing, said switch being positioned in said recess, said switch being electrically coupled to said processor, said processor generating said alarm sequence when said switch is turned on; and an emergency tool being removably coupled to said alarm unit wherein said emergency tool is configured to be manipulated, said emergency tool having a blade thereon wherein said blade is configured to cut a seat belt, said emergency tool having a breaker thereon wherein said breaker is configured to break a window in the vehicle.

2. The assembly according to claim 1, further comprising a fastener being coupled to said front side, said fastener being positioned in said recess.

3. The assembly according to claim 1, further comprising a clip being coupled to said back side, said clip being spaced from said back side wherein said clip is configured to frictionally engage a support.

4. The assembly according to claim 1, further comprising a carbon monoxide detector being coupled to said housing wherein said carbon monoxide detector is configured to detect carbon monoxide in the vehicle, said carbon monoxide detector being electrically coupled to said processor, said processor generating said alarm sequence when said carbon monoxide detector detects carbon monoxide.

5. The assembly according to claim 1, further comprising a speaker being coupled to said housing wherein said speaker is configured to emit audible sounds outwardly therefrom, said speaker being electrically coupled to said processor, said speaker being turned on when said processor generates said alarm sequence wherein said speaker is configured to alert the driver to exit the vehicle.

6. The assembly according to claim 1, further comprising a transceiver being positioned within said housing, said transceiver being electrically coupled to said processor, said transceiver being configured to be in electrical communication with an extrinsic communication network thereby facilitating said transceiver to contact emergency responders when said processor generates said alarm sequence.

7. The assembly according to claim 6, further comprising a button being coupled to said front side of said housing wherein said button is configured to be manipulated, said button being electrically coupled to said processor, said processor generating said alarm sequence when said button is manipulated such that said transceiver contacts the emergency responders.

8. The assembly according to claim 1, further comprising a light emitter being coupled to said front side of said housing wherein said light emitter is configured to emit light outwardly therefrom, said light emitter being electrically coupled to said processor, said light emitter being turned on when said processor generates said alarm sequence wherein said light emitter is configured to facilitate an emergency responder to visually identify the vehicle.

9. The assembly according to claim 1, further comprising a power supply being coupled to said housing, said power supply being electrically coupled to said processor, said power supply comprising at least one battery.

10. The assembly according to claim 2, wherein said emergency tool is removably positioned in said recess having said fastener removably engaging said emergency tool such that said emergency tool is retained in said recess for storage.

11. The assembly according to claim 10, wherein said emergency tool engages said switch when said emergency tool is positioned in said recess to turn said switch off, said switch being turned on said when said emergency tool is removed from said recess.

12. A carbon monoxide alarm assembly being configured to be positioned in a vehicle, said assembly comprising:

an alarm unit being configured to be positioned within a vehicle thereby facilitating said alarm unit to be in fluid communication with an interior of the vehicle, said alarm unit detecting carbon monoxide, said alarm unit emitting an audible alarm when said alarm unit detects carbon monoxide wherein said alarm unit is configured to alert a driver to exit the vehicle, said alarm unit comprising:

a housing having a front side and a back side, said front side having a recess extending toward said back side, a fastener being coupled to said front side, said fastener being positioned in said recess, a clip being coupled to said back side, said clip being spaced from said back side wherein said clip is configured to frictionally engage a support, a processor being positioned within said housing, said processor selectively generating an alarm sequence, a carbon monoxide detector being coupled to said housing wherein said carbon monoxide detector is configured to detect carbon monoxide in the vehicle, said carbon monoxide detector being electrically coupled to said processor, said processor generating said alarm sequence when said carbon monoxide detector detects carbon monoxide, a speaker being coupled to said housing wherein said speaker is configured to emit audible sounds outwardly therefrom, said speaker being electrically coupled to said processor, said speaker being turned on when said processor generates said alarm sequence wherein said speaker is configured to alert the driver to exit the vehicle, a transceiver being positioned within said housing, said transceiver being electrically coupled to said processor, said transceiver being configured to be in electrical communication with an extrinsic communication network thereby facilitating said transceiver to contact emergency responders when said processor generates said alarm sequence, a button being coupled to said front side of said housing wherein said button is configured to be manipulated, said button being electrically coupled to said processor, said processor generating said alarm sequence when said button is manipulated such that said transceiver contacts the emergency responders, a light emitter being coupled to said front side of said housing wherein said light emitter is configured to emit light outwardly therefrom, said light emitter being electrically coupled to said processor, said light emitter being turned on when said processor generates said alarm sequence wherein said light emitter is configured to facilitate the emergency responder to visually identify the vehicle, a switch being coupled to said front side of said housing, said switch being positioned in said recess, said switch being electrically coupled to said processor, said processor generating said alarm sequence when said switch is turned on, and a power supply being coupled to said housing, said power supply being electrically coupled to said processor, said power supply comprising at least one battery; and an emergency tool being removably coupled to said alarm unit wherein said emergency tool is configured to be manipulated, said emergency tool having a blade thereon wherein said blade is configured to cut a seat belt, said emergency tool having a breaker thereon wherein said breaker is configured to break a window in the vehicle, said emergency tool being removably positioned in said recess having said fastener removably engaging said emergency tool such that said emergency tool is retained in said recess for storage, said emergency tool engaging said switch when said emergency tool is positioned in said recess to turn said switch off, said switch being turned on said when said emergency tool is removed from said recess.

* * * * *